United States Patent [19]

Ormsby et al.

[11] Patent Number: 4,889,413

[45] Date of Patent: Dec. 26, 1989

[54] MANUFACTURE OF PHOTOCHROMIC ARTICLES

[75] Inventors: Mary E. Ormsby, Lancashire; William R. Maltman, Merseyside, both of England

[73] Assignee: Pilkington plc, Merseyside, England

[21] Appl. No.: 195,873

[22] Filed: May 19, 1988

[30] Foreign Application Priority Data

May 22, 1987 [GB] United Kingdom ................ 8712210

[51] Int. Cl.[4] ................................................ G02F 1/17

[52] U.S. Cl. .................................... 350/354; 350/409; 351/162

[58] Field of Search ........................ 350/354, 353, 409; 351/162

[56] References Cited

U.S. PATENT DOCUMENTS

| | | | |
|---|---|---|---|
| 3,970,715 | 7/1976 | Jarrett et al. | 525/130 |
| 4,217,391 | 8/1980 | Kaltz | 350/354 X |
| 4,286,957 | 9/1981 | Le Naour-Sene | 351/163 X |
| 4,300,821 | 11/1981 | Mignen | 350/354 X |
| 4,584,229 | 4/1986 | Bourelier | 428/423.3 X |
| 4,681,412 | 7/1987 | Lemelson | 351/162 |
| 4,685,783 | 8/1987 | Heller et al. | 350/586 X |
| 4,699,473 | 10/1987 | Chu | 350/409 |

*Primary Examiner*—Eugene R. Laroche
*Assistant Examiner*—Nathan W. McCutcheon
*Attorney, Agent, or Firm*—Burns, Doane, Swecker & Mathis

[57] ABSTRACT

A process for producing a polyurethane plastics having photochromic properties, characterized in that the process comprises in a first step incorporating a reversible cleavage photochromic compound into at least one di-isocyanate compound or at least one polyol or a mixture of a di-isocyanate and one or more polyols or into any other component of a mixture which, when polymerized, will yield a polyurethane; combining the mixture from the first step with any other necessary components to enable polymerization to occur; and polymerizing the resultant mixture to form a polyurethane incorporating the said photochromic compound. The photochromic polyurethane plastics of the invention are useful as intermediate layers in glass or plastics laminates for architectural applications or for use in vehicle windows or roof-lights.

22 Claims, No Drawings

MANUFACTURE OF PHOTOCHROMIC ARTICLES

The present invention relates to the manufacture of photochromic articles, particularly the manufacture of articles having a polyurethane portion which contains an organic photochromic compound of the type which exhibits photochromism characterised by reversible cleavage of carbon-hetero atom sigma bonds, hereinafter referred to as reversible cleavage photochromics.

The manufacture of such a photochromic article is known from Japan Kokai Tokkyo Koho JP59135152 in the name of Asahi Glass Company Limited. This publication is directed principally towards the manufacture of a photochromic glass for use in motor vehicles. The patent recognises that the organic photochromic material needs to be incorporated into a polymeric host material which has to be laminated to the glass. It is suggested that the high temperature that is necessary to laminate the polymeric layer to the glass cannot be withstood by the organic photochromic material. Asahi's invention is therefore characterised by the lamination of the polymeric layer to the glass before the photochromic material is imbibed into the polymeric layer. The polymeric layer can subsequently be coated by a further layer of polymer which does not contain photochromic material, for protection purposes. The polymeric layer is described as a pre-formed thermo-plastic polyurethane film which is pressed onto the glass plate in an autoclave and then coloured with a liquor containing 1,3,3,4,5-pentamethyl-9′-methoxy spiro indoline. The finished product is described as a blue bi-layer laminate with good impact absorption properties.

In U.S. Pat. No. 3,508,810 Baltzer describes a photochromic window which has a layer of polyvinyl butyral sandwiched between two sheets of glass. This window is manufactured by dissolving a photochromic spiropyran in toluene and then immersing a poly-vinyl butyral sheet into this solution. When the photochromic material is imbibed into the sheet, the sheet is laminated to the glass. Baltzer acknowledges that this system suffers from photochromic fatigue and attempts to reduce it by sealing the edges of the window.

European patent application No. 84113167 describes various photochromic articles all containing compounds described as spiro (indolene) naphth oxazines. It is said that these photochromic compounds can be dissolved in common organic solvents, or can be dispersed in liquids containing water, alcohols or other solvents. Alternatively, the photochromic compounds can be dissolved in colourless or transparent solutions prepared from transparent polymers, co-polymers or blends of such transparent polymers; various suitable solvents are suggested. It is also said that the photochromic compounds can be applied to solid polymerised organic material; various polymers are suggested, including polyurethane and polyvinyl butyral, but these two materials are not preferred.

The prior art does not contain any teaching which would lead a man skilled in the art to conclude that one polymeric host material might offer improvements in the photochromic performance of an article, as compared to an article which utilises a different polymeric material. The long lists of alternative polymers given in patents such as EP 84113167 show that it had not hitherto been appreciated that the selection of the host material could have a significant influence on the photochromic properties of the finished article.

Furthermore, although much research has been carried out in this area, none of the prior art disclosures provides a method for manufacturing photochromic articles which are sufficiently fatigue free for applications such as long-lived prescription lenses or windows for architectural and vehicular applications; for example roof-lights for motor vehicles.

Surprisingly, we have discovered that the selection of polyurethane as the host material for reversible cleavage photochromics can impart considerably enhanced fatigue resistance to the photochromic article. Unexpectedly this improvement has been found to be most useful in the case where the photochromic is dissolved in one of the components of the polyurethane prior to polymerisation.

According to the present invention there is provided a process for producing a polyurethane plastics having photochromic properties, characterised in that the process comprises in a first step incorporating a reversible cleavage photochromic compound into at least one di-isocyanate compound or at least one polyol or a mixture of a di-isocyanate and one or more polyols or into any other component of a mixture which, when polymerised, will yield a polyurethane; combining the mixture from the first step with any other necessary components to enable polymerisation to occur; and polymerising the resultant mixture to form a polyurethane incorporating the said photochromic compound.

Preferably, the reversible cleavage photochromic compound is dissolved in a di-isocyanate or a polyol, or a mixture of polyols, or a mixture of di-isocyanate and one or more polyols, or any other component of a mixture which, when polymerised, will yield a polyurethane. Subsequently, any other necessary components to enable polymerisation to occur are added and the resultant mixture is polymerised to give a polyurethane with the reversible cleavage photochromic compound in solid solution or otherwise held within the polyurethane matrix.

The photochromic compound may be dissolved in a polyol component of the polyurethane, it may alternatively be dissolved in the polyol mixture or in the di-isocyanate component. Photochromic compounds generally dissolve more readily in the di-isocyanate(s); however, for some applications the toxicity of these compounds and the consequent special handling requirements render it advantageous to dissolve the photochromic compound in the polyol components. It is particularly advantageous to dissolve the photochromic compound in the least viscous polyol component and then add the remaining polyol to complete the first step. The catalyst can also be added in this way. Aliphatic or ali-cyclic polyurethane systems are preferred.

The polyurethane may be cured between two opticaly clear sheets. The polyurethane adheres to the two optically clear sheets on curing and produces a tri-layer laminate. The optically clear sheets can be selected to be in the form of front and back curves of an ophthalmic lens, alternatively they can be of the form of front and back surfaces of a laminated window, such as a vehicle roof-light.

The polyurethane may be inpregnated in, or coated onto, a reflecting surface such as paper, card or plastic sheet. For very long life times these articles can be coated with a protective layer of clear plastic, but this is not necessary for many applications. By use of conventional printing techniques it is possible to mark articles so that the marking becomes visible only on exposure to U.V. radiation.

A thermo-plastic polyurethane may alternatively be utilised but the fatigue resistance is not as good as for thermosetting polyurethane systems. The use of thermoplastic polyurethane allows one or both optically transparent sheets to be replaced by a mould element and a mould release agent to be interposed between the polyurethane and the mould element. In the case that one sheet is so replaced a bi-layer laminate will be produced; in the case that both sheets are replaced in this manner an unsupported flexible polyurethane sheet will be produced. Advantageously, the polyurethane sheet is then laminated to one or two sheets of optically clear material by a conventional process. Throughout the specification the term "optically clear" is taken to mean transparent to visible radiation or radiation of the wavelength to which the photochromic material reacts. The degree of transparency is not critical to the invention.

The unsealed edges of a laminate may be ground and polished to produce a finished article such as an ophthalmic lens, conveniently the grinding and polishing operations are carried out without any special precautions nécessitated by the presence of the exposed edges. For some applications, such as vehicle roof-lights, the edge can be sealed, conveniently this is effected by a gasket.

Any polyurethane composition produced by reaction of di-isocyanates and polyols can be used. However, aliphatic or ali-cyclic systems are preferred due to their low background colouration and superior environmental stability (e.g. reduced photo-degradation). Nevertheless, aromatic compositions could be used for applications which do not require low background colour and in which the possible carcinogenic properties of these compositions could be tolerated.

Typical polyurethane components are: di-cyclohexylmethane di-isocyanate, toluene di-isocyanate, polyester diols derived from caprolactone, polyester diols, or tri-methylolpropane.

Polyurethane laminates can be constructed using glass or clear plastic outer layers, in flat or curved form. An example of a possible assembly for use in producing ophthalmic prescription lenses would be a 1 mm polyurethane layer between 2 mm plates. During the filling and curing cycle the 2 mm plates would be held apart by a separating gasket of adhesive butyl rubber strip or any suitable elastomeric plastic. Similarly a 1 mm photochromic polyurethane interlayer could be cast between CR 39 lens forms. The back element could be a "semi-finished" element, allowing the assembled laminate to be subsequently machined to give a prescription lens according to standard semi-finished practice. In this case the separating gasket could be any standard plano-type gasket in suitable plastic and used in normal CR 39 lens manufacture. It will be readily appreciated that stock lenses and special prescription lenses such as those described in UK Pat. No. 8014654 could equally well be produced by similar lamination methods.

When the photochromic polyurethane is to be used for coating or impregnating, the viscosity of the mixture can be reduced in a conventional manner, either by using a low viscosity polyol or by using a solvent such as toluene. An advantage of using solvent is that a higher concentration of photochromic compound can be caused to enter the polyurethane matrix, which is particularly beneficial in reflecting systems which use a thin layer of polyurethane.

Suitable reversible cleavage photochromic compounds are spiro-pyrans, spiro-oxazines, chromenes, heliochromes derived from fulgides. It should be understood that this list is illustrative and is not intended to be limiting. Although all reversible cleavage photochromic materials will exhibit improved service lifetimes when incorporated into polyurethane matrices by the method according to this invention, we have found that the chromenes and spiro-oxazines have particularly useful extended lifetimes.

The invention will now be described further, but not limited, by the following Examples:

EXAMPLE 1

A reversible cleavage photochromic compound of the heliochrome class and having the structure (I) shown below, was dissolved in di-cyclohexylmethane di-isocyanate. 0.002% of di-butyl tin dilaurate was added as a catalyst for the subsequent polymerisation to polyurethane. The solution was mixed with a polyol composition in the ratio 1:0.795. The polyol mixture comprised a polyester diol (54.5 parts), a polyether glycol (32.2 parts), and a tri-methylol propane (13.3 parts). The final concentration of compound (I) was 1.5 kg per cubic meter. The mixture was de-gassed and injected into a prepared glass cell comprising two sheets of 2 mm glass separated by a 1 mm rubber spacing gasket. The polyurethane was cured by heating in an oven at 60° C. for two days. On cooling the polyurethane was found to have cured satisfactorily and to have adhered to the two glass sheets. When exposed to Air Mass 2 irradiation the laminate showed a photochromic change of almost colourless to blue, corresponding to an integrated visible transmission range (IVT) of 86/25. Optical data for the laminate is given in Table below. The chemical structure of Compound I was:

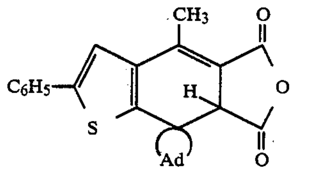

(I)

Ad = adamantyl

EXAMPLE 2

A photochromic laminate was prepared in the same manner as that described for Example 1. The reversible cleavage photochromic compound used was a chromene of chemical structure (II) shown below:

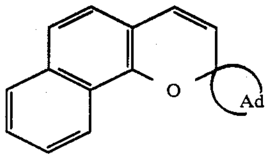

(II)

The final concentration of compound (II) was 1 kg per cubic meter. We have found that different photochromic compounds dissolve at different rates in the isocyanate, but the concentrations in the range 1-3 kg per cubic meter can be achieved without any problem. Optical data for a laminate incorporating compound (II) in polyurethane is given in Table I.

EXAMPLE 3

Example 2 was repeated with a chromene of structure (III). Optical data for the resulting laminate are given in Table I. The structure of chromene (III) was:

(III)

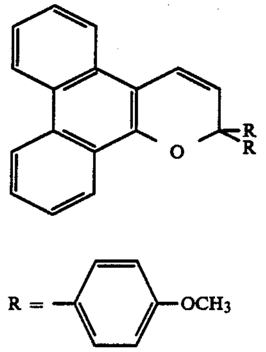

EXAMPLE 4

Example 2 was repeated with a chromene of structure (IV). Optical data for the resulting laminate is given in Table I. The structure of chromene (IV) was:

(IV)

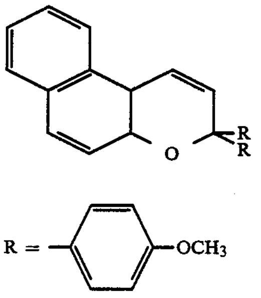

EXAMPLE 5

Example 1 was repeated with a photochromic compound of the spiro-oxazine class having structure (V). Optical data for the resulting laminate is given in Table I below. The structure of photochromic compound (V) was:

(V)

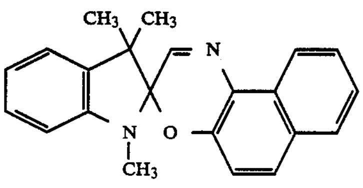

EXAMPLE 6

Example 5 was repeated with a spiro-oxazine compound of structure (VI). Optical data for the resulting laminate is shown in Table I. The structure of compound (VI) was:

(VI)

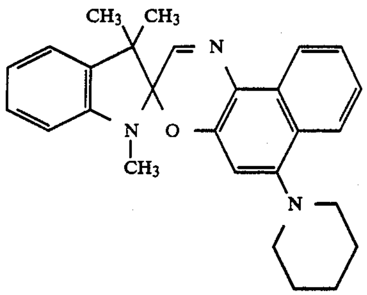

EXAMPLE 7

Example 5 was repeated with a spiro-oxazine of structure (VII). Optical data for the resulting laminate is given in Table I below. The structure of compound (VII) was:

(VII)

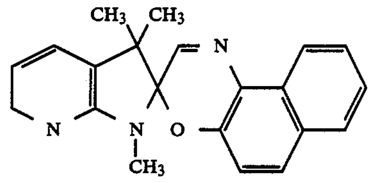

EXAMPLE 8

A reversible cleavage photochromic compound which was a spiro-oxazine with structural formula (VIII) was dissolved in a polyol mixture which comprised a polyester diol (54.5 parts), a polyether glycol (32.2 parts), and a tri-methylol propane (13.3 parts). The dissolution of the photochromic compound was assisted by use of an ultra-sonic bath. The polyol solution was added to di-cyclohexylmethane di-isocyanate containing 0.002% of di-butyl tin dilaurate as catalyst. The resulting mixture was cast into a glass laminate and cured in the same manner as for Example 1 above. The concentration of the photochromic compound in the laminate was approximately 0.4 kg per cubic meter. Optical data for the resulting laminate are given in Table I. The structure of compound (VIII) was:

(VIII)

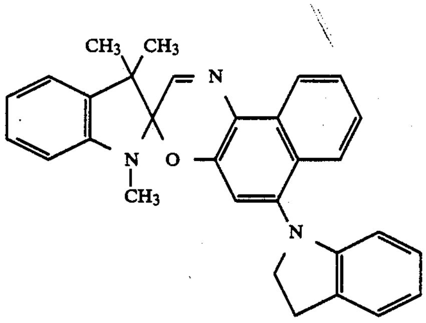

Examples 1–8 demonstrate the wide range of reversible cleavage photochromic compounds that can be incorporated into polyurethane by the method of this invention. The absence of free radical catalysts in the polyurethane system means that survival of active photochromic through the curing process is approximately 100%. This gives more efficient use of the photochromic compound and avoids the problem of UV screening of active photochromic compound by material which has become degraded during the cure cycle, such as occurs in free radical cure systems.

TABLE I

| Example No. | Compound No. | Compound Class | BT | DT | IOD |
|---|---|---|---|---|---|
| 1 | I | heliochrome | 88 | 4 | 1.3 |
| 2 | II | chromene | 88 | 18 | 0.7 |
| 3 | III | chromene | 15.5 | 0.1 | 2.2 |
| 4 | IV | chromene | 89 | 45 | 0.3 |
| 5 | V | spiro-oxazine | 90 | 23 | 0.6 |
| 6 | VI | spiro-oxazine | 57 | 0.1 | 2.5 |
| 7 | VII | spiro-oxazine | 88 | 55 | 0.2 |
| 8 | VIII | spiro-oxazine | 89.5 | 13 | 0.8 |

BT = % light transmission in bleached state at λ max of coloured form
DT = % light transmission in darkened state at λ max of coloured form
IOD = induced optical density = $\log_{10}\frac{BT}{DT}$

EXAMPLE 8

A photochromic compound having the structure I was incorporated into polyurethane as per Example 1. The laminate was subjected to outside daylight exposure to assess photochromic stability. The results are given in Table 2. The initial and final transmission ranges are expressed in terms of percentage transmission at the wavelength which gives rise to the greatest degree of darkening of the photochromic compound. Extrapolation of the data collected gives the predicted time for a 50% loss in transmission range.

COMPARATIVE EXAMPLE 9

A photochromic article was prepared by surface dyeing of compound I into CR 39. The conditions of imbibition to achieve a photochromic range comparable to Example 9 were imbibition from high temperature silicone oil at 180° C. for 30 minutes. The results of exposure testing are shown in Table 2.

EXAMPLE 10

Photochromic compound II was incorporated into a polyurethane interlayer between CR 39 sheets. The resulting photochromic laminate was subjected to outside exposure testing and the results are given in Table 2. The concentration of the compound II in the polyurethane was 0.9 kg per cubic meter.

COMPARATIVE EXAMPLE 10

The photochromic article was prepared by surface dyeing of compound II into CR 39. The conditions of imbibition to achieve a photochromic range comparable to Example 10 were imbibition from high temperature silicone oil at 180° C. for 30 minutes. The results of outside exposure testing are given in Table 2. It will be readily apparent that the sample prepared by imbibition for this comparative example performed markedly less well than the laminated sample prepared and tested in Example 10.

EXAMPLE 11

A photochromic spiro-oxazine compound of structure V was incorporated into a laminate by the method according to Example 5. The results of outside exposure testing are given in Table 2.

COMPARATIVE EXAMPLE 11A

A photochromic article was prepared by surface dyeing of compound V into CR 39. The conditions of imbibition to achieve a photochromic range comparable to Example 11 were imbibition from high temperature silicone oil at 180° C. for 30 minutes. The results of outside exposure testing are given in Table 2.

COMPARATIVE EXAMPLE 11B

Photochromic compound V was directly cast into an acrylic medium (tri-ethyleneglycol di-methacrylate). The resulting photochromic article was subjected to outside exposure testing and the results are given in Table 2.

EXAMPLE 12

A photochromic laminate incorporating photochromic compound VI was prepared in accordance with Example 6 above. The laminate was subjected to outside exposure testing and the results are given in Table 2.

COMPARATIVE EXAMPLE 12

Photochromic compound VI was directly cast into tri-ethyleneglycol di-methacrylate. The resulting photochromic article was subjected to outside exposure testing and the results are given in Table 2.

EXAMPLE 13

Photochromic compound VII was incorporated into a photochromic laminate in accordance with Example 7 above and the resulting laminate subjected to outside exposure testing. The results are given in Table 2.

COMPARATIVE EXAMPLE 13

Photochromic compound VII was surface dyed into CR 39 by imbibition from high temperature silicone oil. The conditions of imbibition were 180° C. for 30 minutes. The results of outside exposure testing are shown in Table 2.

The Examples and Comparative Examples tested and tabulated in Table 2 clearly demonstrate that for each photochromic compound incorporated into a photochromic article by the method of this invention, the rate of loss of photochromism is less than that exhibited by the same photochromic compound incorporated into a photochromic article either by imbibition or direct casting into an alternative polymer. More specifically, the method of pre-dissolving the photochromic compound in one component of the polyurethane and subsequently polymerising the polyurethane gives considerably superior results to incorporation methods as recommended and described by the prior art. It should be noted that any attempt to cast a photochromic material directly into a CR 39 polymer would result in an unacceptable degradation of the photochromic material, due to attack during the polymerisation of the CR 39.

EXAMPLE 14

A photochromic polyurethane laminate was prepared in the same manner as for Example 6 above. The laminate was subjected to accelerated tests using a modified Marr weatherometer. The Marr apparatus uses a 6 kilowatt xenon arc lamp and the samples are continuously exposed at a distance of about 0.5 m from the lamp. The temperature was approximately 50° C. The test equates 2000 hours of exposure in the weatherometer to 10 years of in-service life. The polyurethane laminate was exposed for 324 hours and the resulting data is given in Table 3. Transmission data is measured at a wavelength 560 nm.

COMPARATIVE EXAMPLE 14A

A photochromic polyurethane laminate was prepared using a thermo-plastic pre-formed polyurethane interlayer material and lacquer spraying the photochromic material used for Example 14 in a suitable solvent. Initially such a laminate gave a performance comparable to that obtained by using the method described for Example 14. However, after accelerated testing this example showed a much greater loss of photochromic range than that exhibited by Example 14. The thermoplastic polyurethane which was used was a Quinn PE 193 polyurethane.

COMPARATIVE EXAMPLE 14B

Again a Quinn PE 193 polyurethane was used to form a laminate with the same photochomic compound as that used for Example 14. This time the photochromic compound was brush coated onto the laminate, rather than spray coated as in Comparative Example 14A. The results of testing this brush coated laminate are given in Table 3. It can be seen that the loss of photochromism after prolonged exposure was considerable.

COMPARATIVE EXAMPLE 14C

Besides polyurethane, the other commonly used interlayer material, especially for vehicular applications, is polyvinylbutyral. Example 14A was repeated, but with the polyurethane replaced by a polyvinylbutyral layer. The results of accelerated exposure testing are given in Table 3. It will be seen that the loss of photochromic range after prolonged exposure was considerable, greater even than that encountered in Comparative Example 14A.

COMPARATIVE EXAMPLE 14D

Again the polyvinylbutyral interlayer system was used, this time the photochromic compound was incorporated by hot bed diffusion. Initially the photochromic performance of the resulting laminate was similar to that obtained for the sprayed polyvinylbutyral laminate of Comparative Example 14C. After accelerated exposure testing the laminate had completely fatigued and exhibited no photochromic behaviour.

The results tabulated in Table 3 demonstrate that for a given photochromic compound incorporation into polyurethane by the method according to this invention gives enhanced service lifetimes when compared to the same compound incorporated into polyurethane by different methods or incorporated into polyvinylbutyral by different methods. It would not be possible to incorporate a photochromic compound into polyvinylbutyral by the method according to this invention because the methods currently utilised for the preparation of polyvinyl butyral, and for its subsequent handling, produce many opportunities for reactions which degrade the photochromic material. Comparative Example 14A and Comparative Example 14B were performed on thermo-plastic polyurethane sheets, rather than the thermo-setting compositions that had been utilised for previous examples.

EXAMPLES 15–22

To show that the method of this invention can also be applied to thermo-plastic polyurethane a series of examples was performed. Two photochromic materials were used: photochromic compound VI and photochromic compound VIII. These two photochromic compounds were tested in the thermo-setting polyurethane composition described in Example 1 above (see Examples 15 and 16) and in three thermo-plastic polyurethane compositions. PU 180 was a composition using a capa 720 polyol mixed with polyester/polyether caprolactone (2000M wt) (see Examples 17 and 18); PU 181 was a mixture of teracol 1000 and polyether (1000M wt) (See Examples 19 and 20) and PU 183 was a mixture of capa 212, polyester/polycaprolactone (1000M wt) (See Examples 21 and 22). The results of Examples 15–22 are tabulated in Table 4. A comparison of the final ranges after 324 hours' accelerated testing shows that the benefits arising from the method of this invention are obtained for both thermo-set and thermoplastic polyurethanes.

We have conducted a series of tests to determine whether a thermo-plastic photochromic sheet needs to be laminated to an impervious material on one or both sides in order to gain a satisfactory service life for the photochromic article. Four tests were performed, in each case the test article was exposed for 149 hours in the Marr weatherometer.

EXAMPLE 23

A thermo-plastic polyurethane photochromic sheet was laminated to glass sheets on both sides. The initial and final photochromic ranges are tabulated in Table 5.

EXAMPLE 24

A thermo-plastic polyurethane photochromic sheet was laminated on one side only to a glass sheet and exposed to accelerated testing with the glass side of the bi-layer laminate oriented towards the xenon lamp. The results are given in Table 5.

EXAMPLE 25

Example 24 was repeated, but this time exposure was with the polyurethane side of the bi-layer laminate towards the xenon lamp. The results are again tabulated in Table 5.

EXAMPLE 26

A polyurethane film was directly exposed to the xenon lamp in the accelerated test machine. The results are given in Table 5.

From Table 5 it can be seen that the triple laminate fatigued less than the bi-layer laminate which fatigued less than the unlaminated polyurethane film. No difference was detected between exposing the bi-layer laminate on the glass side and the polyurethane side. For most light transmitting applications the use of a tri-layer laminate is to be preferred because of the greater protection thereby afforded. Lamination could be between glass or by way of a protective layer over a polyurethane coating. Fatiguing of the edge of the laminate structure can be prevented by sealing the edge, although this is generally unnecessary in the case of ophthalmic lenses. We have found that edge effects are so slight as to be inconsequential in laminates prepared by directly casting a thermosetting polyurethane. This contrasts with laminates prepared from thermoplastic polyurethane sheet which appear to suffer more from edge effects and can therefore benefit significantly from having their edges sealed.

TABLE 2

| Example | Compound | Initial Range | Outside Exposure (days) | Final Range | Predicted time to 50% loss (days) |
|---|---|---|---|---|---|
| 9 | I | 86/36 | 15 | 88/59 | 13 |
| C9 | I | 86/36 | 3 | No darkening | (Complete fatigue 3 days) |
| 10 | II | 90/16 | 600 | 84/20.5 | 1613 |
| C10 | II | 89/17 | 12 | 88/48 | 9 |
| 11 | V | 90/27 | 349 | 89/34 | 727 |
| C11A | V | 87/47 | 107 | 89/65 | 107 |
| C11B | V | 88/47 | 111 | 88/58 | 179 |
| 12 | VI | 76/2 | 134 | 76/2 | No loss measured |
| C12 | VI | 54/4.7 | 111 | 44/15.7 | 96 |
| 13 | VII | 90/3.6 | 349 | 89/44 | 758 |
| C13 | VII | 92/69 | 49 | 92/78 | 57 |

TABLE 3

| Example | Initial Range | Exposure (hours) | Final Range | Loss in range % |
|---|---|---|---|---|
| 14 | 87/0.9 | 324 | 85/2 | 18 |
| C14A | 84/0.4 | 230 | 84/2.4 | 34 |
| | | 324* | 84/5.2* | 48* |
| C14B | 92/0.5 | 324* | 86/11* | 60* |
| | | 375 | 87/17 | 70 |
| C14C | 82/6 | 279 | 80/41 | 76 |
| | | 324* | 80/58* | 88* |
| C14D | 80/5 | 324 | No darkening | complete fatigue |

*predicted by extrapolation or interpolation of measured values

TABLE 4

| Example | Compound | Polyurethane | Initial Range | Final Range |
|---|---|---|---|---|
| 15 | VI | Thermoset | 87/0.9 | 85/2.0 |
| 16 | VIII | Thermoset | 87/7.0 | 83/4.0 |
| 17 | VI | PU 180 | 81/0.1 | 79/0.4 |
| 18 | VIII | PU 180 | 82/0.3 | 80/1.2 |
| 19 | VI | PU 181 | 79/0.1 | 80/0.3 |
| 20 | VIII | PU 181 | 80/0.4 | 80/1.0 |
| 21 | VI | PU 183 | 80/0.3 | 76/0.4 |
| 22 | VIII | PU 183 | 82/0.8 | 80/1.1 |

TABLE 5

| Example | Initial Range | Final Range |
|---|---|---|
| 23 | 88/17 | 88/24 |
| 24 | 82/18 | 88/40 |
| 25 | 82/16 | 88/40 |
| 26 | 82/17 | 84/63 |

EXAMPLE 27

In addition to the light transmitting systems exemplified above, we have found that polyurethane matrices according to the invention also provide superior fatigue properties when used in so called reflecting systems.

A photochromic compound having the structure (VI) was incorporated into polyurethane as per Example 1. Before the polyurethane mix was cured a variety of paper and stiff card materials were dipped into the mixture and thereby impregnated with it. The concentration of photochromic compound in the mixture was 0.2% w/v. The impregnated materials were cured by heating in an oven at 130° C. for two hours.

EXAMPLE 28

A photochromic compound having the structure (VI) was incorporated into polyurethane as per Example 27. Toluene was then added to thin the mixture. Toluene was selected because it is an inactive solvent, any other suitable inactive solvent could have been used instead of toluene. The thinned uncured polyurethane was then applied to plastic sheeting with a paint brush.

EXAMPLE 29

Samples prepared by the methods of Examples 27 and 28 were repeatedly exposed to U.V. radiation bursts. Each time the portion of the sample coated or impregnated with the polyurethane containing the photochromic compound coloured to an extent clearly visible to the human eye. Each time the colour faded away after about 1 minute. Even after many hundreds of exposures the articles still appeared to colour and fade to the same extent.

We claim:

1. A process for producing polyurethane plastics having photochromic properties from at least one di-isocyanate compound and at least one polyol, which process comprises selecting at least one di-isocyanate compound together with at least one polyol and a polyurethane polymerisation catalyst, incorporating a reversible cleavage photochromic compound into at least one of the selected at least one di-isocyanate compound and the selected at least one polyol; forming a mixture including the photochromic compound; and polymerising the mixture to form a polyurethane incorporating the said photochromic compound.

2. A process according to claim 1, wherein the resultant polyurethane is a thermoset polyurethane.

3. A process according to claim 1, wherein the resultant polyurethane is a thermoplastic polyurethane.

4. A process according to claim 1, wherein the resultant polyurethane is an aliphatic or alicyclic polyurethane.

5. A process according to claim 1, wherein the at least one di-isocyanate compound of the polyurethane is a di-cyclohexylmethane di-isocyanate, toluene di-isocyanate or mixtures thereof.

6. A process according to claim 1, wherein the at least one polyol compound of the polyurethane is a polyester derived from caprolactone, a polyetherdiol, trimethylolpropane, or mixtures thereof.

7. A process according to claim 1, wherein the photochromic compound is a spiro-pyran, a spiro-oxazine, a chromene, or a heliochrome derived from a fulgide.

8. A process according to claim 7, wherein the photochromic compound is a heliochrome compound of formula (I) as defined in Example 1, a chromene compound of formula (II) as defined in Example 2 or of formula (III) as defined in Example 3 or of formula (IV) as defined in Example 4, a spiro-oxazine compound of formula (V) as defined in Example 5 or of formula (VI) as defined in Example 6 or of formula (VII) as defined in Example 7 or of formula (VIII) as defined in Example 8.

9. A process according to claim 1, wherein the photochromic compound is dissolved in the at least one polyol of the polyurethane.

10. A process according to claim 1, wherein the photochromic compound is dissolved in the at least one di-isocyanate of the polyurethane.

11. A process according to claim 1, wherein the polymerisation of the polyurethane mixture is performed between two optically clear sheets thereby to form a laminate.

12. A process according to claim 11, wherein one or both of said sheets is replaced by a mould element carrying a mould release agent thereby to form a bi-layer laminate or an unsupported polyurethane sheet respectively.

13. A process according to claim 1, wherein the polyurethane mixture is coated onto or impregnated into the surface of an article prior to polymerisation of the polyurethane mixture.

14. A process according to claim 13, wherein a diluent is added to the polyurethane mixture thereby to facilitate coating of the article with the polyurethane mixture.

15. A photochromic polyurethane-containing laminate comprising two outer optically clear sheets of glass or plastics having adhered thereto an intermediate layer of a polyurethane plastics having photochromic properties, the polyurethane being formed by polymerisation of at least one di-isocyanate compound with at least one polyol wherein the laminate has been prepared by a process which comprises selecting at least one di-isocyanate compound together with at least one polyol and a polyurethane polymerisation catalyst, incorporating a reversible cleavage photochromic compound into at least one of the selected at least one di-isocyanate compound and the selected at least one polyol; forming a mixture including the photochromic compound; introducing the mixture into an intermediate space between the said sheets, and polymerising the mixture to form the said intermediate layer.

16. A photochromic polyurethane-containing laminate according to claim 15, wherein the photochromic compound is a spiro-pyran, a spiro-oxazine, a chromene, or a heliochrome derived from a fulgide.

17. A photochromic polyurethane-containing laminate according to claim 15, wherein the photochromic compound is a heliochrome compound of formula (I) as defined in Example 1, a chromene compound of formula (II) as defined in Example 2 or of formula (III) as defined in Example 3 or of formula (IV) as defined in Example 4, a spiro-oxazine compound of formula (V) as defined in Example 5 or of formula (VI) as defined in Example 6 or of formula (VII) as defined in Example 7 or of formula (VIII) as defined in Example 8.

18. A photochromic polyurethane laminate according to claim 15, wherein the said sheets are flat.

19. A photochromic polyurethane laminate according to claim 15, in the form of a lens.

20. A window for architectural use or for use in a vehicle, the window incorporating a laminate as claimed in claim 15.

21. A vehicle roof-light incorporating a laminate as claimed in claim 15.

22. A reflecting system comprising a reflecting surface such as paper, card or plastics sheet coated with or impregnated with a photochromic polyurethane plastics coating, formed by polymerisation of at least one di-isocyanate compound with at least one polyol, the photochromic polyurethane coating having been prepared by selecting at one least di-isocyanate compound together with at least one polyol and a polyurethane polymerisation catalyst incorporating a reversible cleavage photochromic compound into at least one of the selected at least one di-isocyanate compound and the selected at least one polyol; forming a mixture including the photochromic compound; coating or impregnating the reflecting surface with the mixture and polymerising the said mixture to form the said photochromic polyurethane plastics coating.

* * * * *